US012782982B2

(12) United States Patent
Gormley et al.

(10) Patent No.: US 12,782,982 B2
(45) Date of Patent: Nov. 3, 2026

(54) SYSTEMS, METHODS, AND DEVICES FOR AUTOMATIC WATER PRESSURE CONTROL

(71) Applicant: Starbucks Corporation, Seattle, WA (US)

(72) Inventors: Joseph Emil Gormley, Mercer Island, WA (US); Nathan Christopher Bockman Oren, Edgewood, WA (US)

(73) Assignee: Starbucks Corporation, Seattle, WA (US)

( * ) Notice: Subject to any disclaimer, the term of this patent is extended or adjusted under 35 U.S.C. 154(b) by 266 days.

(21) Appl. No.: 18/416,345

(22) Filed: Jan. 18, 2024

(65) Prior Publication Data

US 2024/0248499 A1 Jul. 25, 2024

Related U.S. Application Data

(60) Provisional application No. 63/480,894, filed on Jan. 20, 2023.

(51) Int. Cl.
*G05D 16/20* (2006.01)

(52) U.S. Cl.
CPC .................................. *G05D 16/204* (2013.01)

(58) Field of Classification Search
CPC ......................... G05D 16/204; G05D 16/2046
See application file for complete search history.

(56) References Cited

U.S. PATENT DOCUMENTS 9,857,803 B1 * 1/2018 Abuda .................... E03B 7/071
11,097,210 B2 8/2021 Remboski et al.
(Continued)

FOREIGN PATENT DOCUMENTS

CN 105386487 B 10/2017
CN 106444881 B 5/2019
(Continued)

OTHER PUBLICATIONS

"Bypass Valve on Water Softener"; Quality Water Treatment, https://qualitywatertreatment.com/blogs/news/bypass-valve-on-water-softner, dated Apr. 20, 2022.

*Primary Examiner* — Christopher W Carter
(74) *Attorney, Agent, or Firm* — Knobbe, Martens, Olson & Bear, LLP

(57) ABSTRACT

A pressure control system may include a controller. A pressure control system may include a first sensor configured to determine a pressure of water flow through a first water inlet and transmit a signal to the controller indicative of the pressure of water flow through the first water inlet. A pressure control system may include a second sensor configured to determine a pressure of water flow through a second water inlet transmit a signal to the controller indicative of the pressure of water flow through the second water inlet. A pressure control system may include a valve in the second water inlet. The first water inlet may be an inlet from a water filtration system, and the second water inlet may be a water filtration bypass. The controller may be configured to open and close the valve based on received signals from the first sensor and/or the second sensor in order to maintain the pressure of water flow in the water supply system above a predetermined threshold.

19 Claims, 4 Drawing Sheets

(56) References Cited

U.S. PATENT DOCUMENTS

| | | | | |
|---|---|---|---|---|
| 2006/0186026 | A1* | 8/2006 | Saleh | C02F 9/20 210/138 |
| 2010/0116742 | A1* | 5/2010 | Cartwright | C02F 1/441 210/321.83 |
| 2023/0149836 | A1* | 5/2023 | Hawksley | B01D 37/046 210/741 |
| 2023/0266776 | A1* | 8/2023 | Decato | E03B 7/071 700/283 |

FOREIGN PATENT DOCUMENTS

| | | | |
|---|---|---|---|
| CN | 111236361 | A | 6/2020 |
| CN | 112987811 | A | 6/2021 |
| DE | 102019106682 | B4 | 7/2022 |
| WO | WO 2013/144598 | A1 | 10/2013 |
| WO | WO 2022/203736 | A1 | 9/2022 |

* cited by examiner

SYSTEMS, METHODS, AND DEVICES FOR AUTOMATIC WATER PRESSURE CONTROL

INCORPORATION BY REFERENCE TO ANY PRIORITY APPLICATIONS

This application claims priority to U.S. Provisional Patent Application No. 63/480,894, filed Jan. 20, 2023, the entirety of which is incorporated herein by reference.

FIELD

The present disclosure relates to systems, methods, and devices for automatic water pressure control, such as, in certain embodiments, systems and methods for automatically engaging a water filter bypass to maintain water pressure in a water supply system.

BACKGROUND

Pressure of water flow through a water filtration system may decrease below an acceptable level due to contaminants captured by a water filter or among other causes, specifically in reverse osmosis (RO) systems, a pressure in an RO tank may decrease. To maintain an acceptable pressure of water flow through a water supply system, currently, a decrease in pressure must be manually identified and a water bypass must be engaged manually.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, a system for automatic water pressure control in a water supply system can include: a controller; a first sensor configured to determine a pressure of water flow through a first water inlet and transmit a signal to the controller indicative of the pressure of water flow through the first water inlet; a second sensor configured to determine a pressure of water flow through a second water inlet transmit a signal to the controller indicative of the pressure of water flow through the second water inlet; and a valve in the second water inlet, wherein the first water inlet is an inlet from a water filtration system, and the second water inlet is a water filtration bypass, and wherein the controller is configured to open and close the valve based on received signals from the first sensor and/or the second sensor in order to maintain the pressure of water flow in the water supply system above a predetermined threshold, and wherein the controller is configured to transmit information to a computer system indicative of when the pressure of water flow in the water supply system is below the predetermined threshold and/or when the pressure of water flow in the water supply system is above the predetermined threshold.

In some embodiments, the controller cam be integrated with the first sensor and/or the second sensor.

In some embodiments, the valve can be opened and closed manually.

In some embodiments, the water filtration system can be a reverse osmosis filtration system.

In some embodiments, the predetermined threshold can be between about 30 PSI and about 90 PSI.

In some embodiments, the controller can be configured to open the valve so water flows through the second water inlet if the pressure of water flow in the water supply system decreases below the predetermined threshold.

In some embodiments, the controller can be configured to close the valve so water flows through the first water inlet when the pressure of water flow in the water supply system increases above the predetermined threshold.

In some embodiments, the controller can be configured to open the valve so water flows through the second water inlet if the pressure of water flow in the water supply system decreases below the predetermined threshold for a predetermined period of time.

In some embodiments, the controller can be configured to close the valve so water flows through the first water inlet when the pressure of water flow in the water supply system increases above the predetermined threshold for the predetermined period of time.

In some embodiments, the predetermined period of time can be between about 5 minutes and about 60 minutes.

In some embodiments, the controller can be Internet of Things (IOT) enabled.

In some embodiments, the computer system can be configured to automatically schedule a maintenance request based on the information received from the controller.

In some embodiments, a method of maintaining pressure of water flow in a water supply system can include: determining, by a first sensor, a pressure of water flow through a first water inlet, wherein the first water inlet is an inlet from a water filtration system; transmitting, by the sensor, a signal to a controller indicative of the pressure of water flow through the first water inlet; receiving, by the controller, the signal from the first sensor; comparing, by the controller, the pressure of water flow through the first water inlet to a predetermined threshold; if the pressure of water flow through the first water inlet is below the predetermined threshold, opening, by the controller, a valve in a second water inlet, wherein the second water inlet is an inlet from a water bypass; determining, by a second sensor, a pressure of water flow through the second water inlet; transmitting, by the second sensor, a signal to the controller indicative of the pressure of water flow through the second water inlet; receiving, by the controller, the signal from the second sensor; comparing, by the controller, the pressure of water flow through the second water inlet to the predetermined threshold; if the pressure of water flow through the second water inlet is above the predetermined threshold, closing, by the controller, the valve in the second water inlet; transmitting, by the controller, information to a computer system indicative of the pressure through the first water inlet decreasing below the predetermined threshold and/or the pressure through the second water inlet increasing above the predetermined threshold.

In some embodiments, the predetermined threshold can be between about 30 PSI and about 90 PSI.

In some embodiments, the controller can open the valve if the pressure of the water through the first water inlet is below the predetermined threshold for a predetermined period of time.

In some embodiments, the controller can close the valve if the pressure of the water through the second water inlet is above the predetermined threshold for the predetermined period of time.

In some embodiments, the predetermined period of time can be between about 5 minutes and about 60 minutes.

In some embodiments, the water filtration system can be a reverse osmosis filtration system.

In some embodiments, the computer system can be configured to schedule a maintenance request based on the information received from the controller.

In some embodiments, the computer system can be configured to process the information received from the controller to determine malfunctions of the water supply system.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Figure 1A:
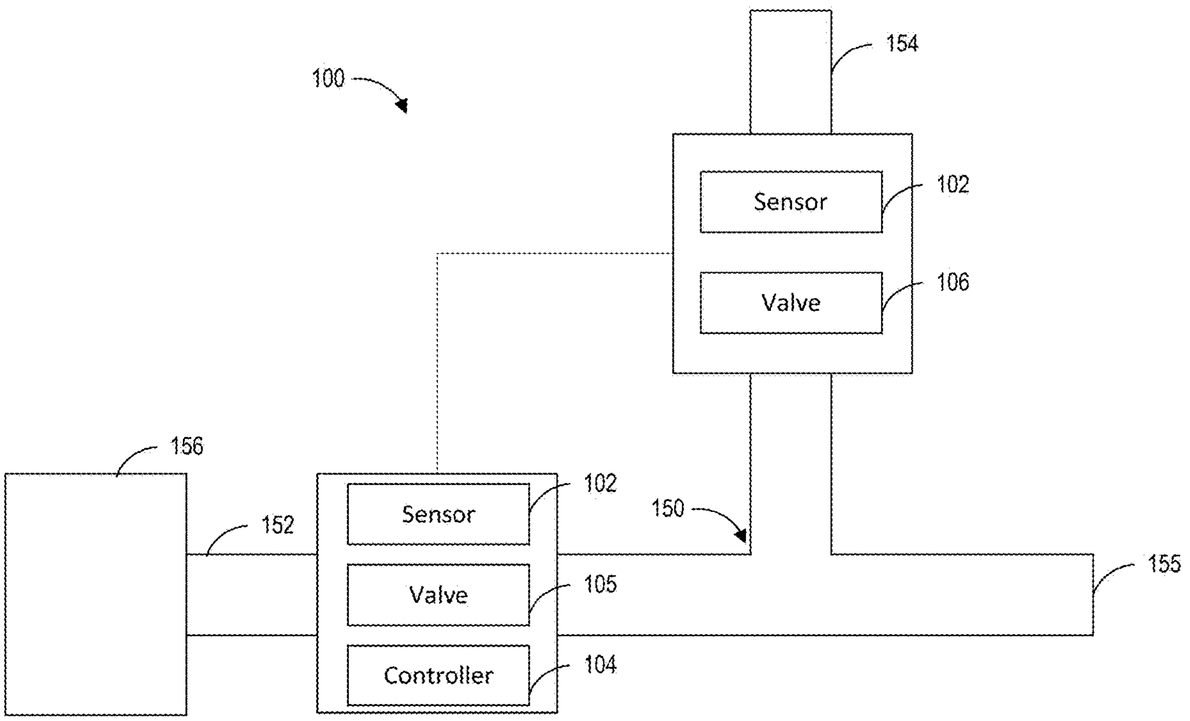
FIGS. 1A and 1B illustrate schematics of embodiments of systems for automatic water pressure control.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

In order to maintain pressure in a water supply system, users must manually engage a water bypass if the pressure of the water flow through a water filtration system drops below an acceptable level. At coffee stores or other food service establishments, a drop in pressure in the water supply system may affect beverage or food throughput and may cause equipment malfunction or failure. A manager or other user must manually identify that the pressure of the water flow through the water supply system has dropped either by identifying issues with equipment and/or reading a pressure gage. In response to the drop in pressure, the manager or other user must manually engage a water bypass for a period of time to increase the pressure of the water flow back to an acceptable level. The manager or other user must manually identify that the pressure of the water flow is above the acceptable level and manually disengage the water bypass. If the manager or other user is busy with other tasks, the manager or other user may forget to disengage the water bypass and/or forget to make a service request to repair any issues with the water supply system.

Failure to manually identify changes in the pressure of water flow quickly or within a certain time can lead to equipment failure or unfiltered water flowing through the supply system for a longer time than necessary. Additionally, focusing on the pressure of water flow can take time away from the manager or other user's other duties, which can reduce the efficiency or throughput of the coffee store or food service establishment.

In accordance with several embodiments, the systems described herein advantageously automatically measure the pressure of water flow through a water supply system. The systems include sensors to measure the pressure of water flow from a water filtration system and/or a water filtration bypass. The systems may include a controller that may automatically the water filtration bypass when the pressure of water flow in the system drops below a predetermined pressure threshold by automatically opening and/or closing one or more valves in the water supply system. The controller and/or any other components of the automatic pressure control system may communicate with a computer system in order to schedule maintenance requests. The computer system can schedule the maintenance requests and/or analyze data received from various automatic pressure control systems to determine large scale water supply issues or equipment failure.

FIG. 1A shows an embodiment of a system 100 for automatic pressure control in a water supply system 150. The water supply system 150 may include a first water inlet 152, a second water inlet 154, and/or an outlet 155. The first water inlet 152 may be a pipe configured to carry or convey water from a water filtration system 156 to the outlet 155. The second water inlet 154 may be a pipe configured to carry or convey water from a water bypass system 158. The filtration system 156 may include a reverse osmosis filter, a mechanical filter, a sequestration filer, an ion exchange filter, an activated alumina filter, an activated carbon filter, a ceramic filter, a mesh filter, an ultraviolet light filter, and/or any other type of water filter. In some embodiments, the water filtration system 156 may be a triple-filtered reverse osmosis system. In some embodiments, the water filtration system 156 may be a single-stage, a two-stage, and/or a three-stage water filtration system.

The system 100 may include a sensor 102, a controller 104, a first valve 105 and/or a second valve 106. The valves 105, 106 can be a ball valve, a gate valve, globe valve, a butterfly valve, a needle valve, a check valve, a diaphragm valve, a washer valve, a plug valve, a pressure balanced valve, and/or any other type of water valve. In some embodiments, the valves 105, 106 can be electronically operated (i.e., a solenoid valve) and/or manually operated. In some embodiments, first valve 105 may be a same type of valve as second valve 106.

The sensor 102 may be a pressure sensor. The sensor 102 may be an absolute pressure sensor, a gauge pressure sensor, and/or a differential pressure sensor. The sensor 102 may be located upstream and/or downstream from the first valve 105 and/or the second valve 106. In certain embodiments, the system 100 may include a plurality of sensors 102. The sensor 102 may provide a signal that correlates to a pressure of a fluid flow in the first water inlet 152, the second water inlet 154, and/or the outlet 155. The sensor 102 may transmit a signal that can be indicative of the pressure of the fluid flow to the controller 104. The sensor 102 may transmit the signal that can be used to indicate the pressure of the fluid flow in real time or substantially real time. The sensor 102 may create a feedback loop with the controller 104.

The sensor 102 may be coupled to the controller 104 via a wireless or a wired connection. The controller 104 may receive the signal from the sensor 102. The controller 104 may control (i.e., open and/or close) the valves 105, 106 based on the signal received from the sensor 102. The controller 104 may control the valves 105, 106 via a wireless or a wired connection.

In some embodiments, the sensor 102, the controller 104, the first valve 105, and/or the second valve 106 can include a communication module. In certain embodiments, the sensor 102, the controller 104, the first valve 105, and/or the second valve 106 may be internet of things (IOT) enabled. The sensor 102, the controller 104, the first valve 105, and/or the second valve 106 may transmit signals to a computer system. The computer system and/or the controller may be configured to process the signals to determine malfunctions of the water supply system 150. The computer system and/or the controller 104 may automatically schedule a service call based on the signals.

In some embodiments, the computer system may receive signals from a plurality of systems 100. The computer system may process the signals to determine trends or information associated with the plurality of systems 100. The computer system may determine a downtime for each of the plurality of systems 100, wherein downtime is determined based on when each of the plurality of system 100 have the water bypass engaged (i.e., the first valve 105 closed and the second valve 106 open). The computer system may process the signals to generate one or more maps, charts, graphics, or other indications of systems 100 with the water bypass engaged. The computer system may generate the one or more maps, charts, graphics, or other indications in real time or substantially real time. The computer system may analyze the signals over time to determine if one or more portions of the plurality of systems 100 and/or one or more of a plurality of water supply systems 150 need to be replaced, upgraded, or otherwise maintained.

Figure 1B:
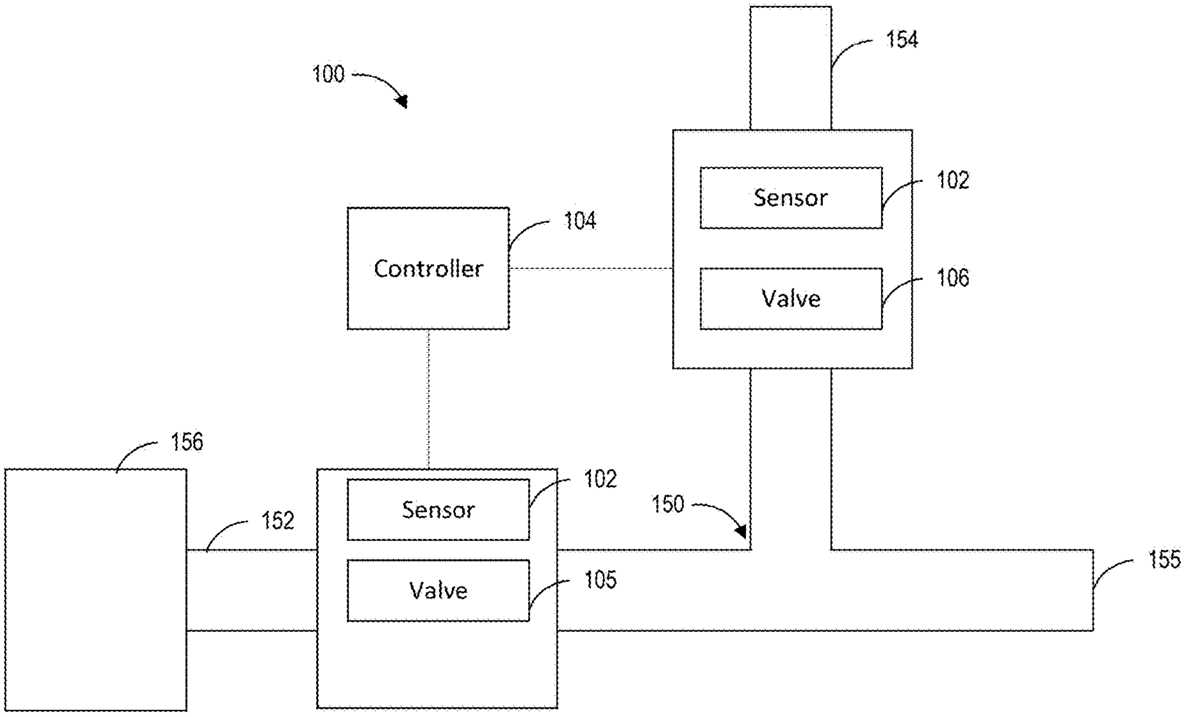

In some embodiments, as shown in FIG. 1A, the sensor 102 and the controller 104 may be integrated as a combined sensor-controller. In some embodiments, as shown in FIG. 1B, the controller 104 may be separate from the sensor 102.

Figure 2:
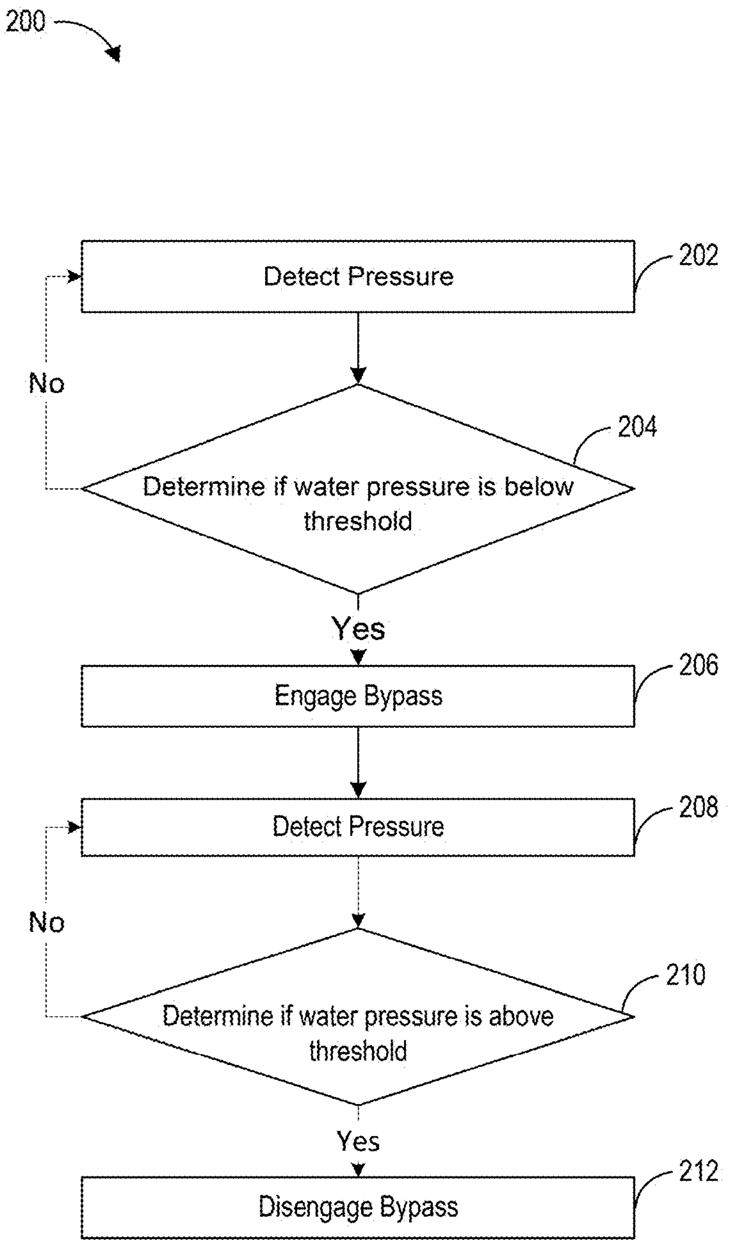
FIG. 2 illustrates a method for automatic water pressure control.

FIG. 2 illustrates a method 200 of using a system 100 for automatic pressure control in a water supply system 150. As in FIG. 2, at step 202, the sensor 102 may detect a pressure of a water flow through the first water inlet 152. The sensor 102 may transmit a signal that can be indicative of the pressure of the water flow to the controller 104.

At step 204, the controller 104 may determine if the pressure of the water flow is (e.g., decreases) below a threshold. The controller 104 may compare the pressure of the water flow to the threshold. In some embodiments, the threshold may be between about 30 pounds per square inch (PSI) and about 90 PSI. In some embodiments, the threshold may be between about 40 PSI and about 80 PSI. In some embodiments, the threshold may be between about 50 PSI and 70 PSI.

In some embodiments, the controller 104 may compare the pressure of the water flow to the threshold over a period of time. The controller 104 may compare the pressure of the water flow to the threshold over a period of time to determine if the pressure has been below the threshold for longer than a time threshold. In some embodiments, the time threshold may be between about 5 minutes and about 60 minutes. In some embodiments, the time threshold may be between about 10 minutes and about 50 minutes. In some embodiments, the time threshold may be between about 20 minutes and 40 minutes.

If at step 204, the controller 104 determines the pressure is not below the threshold or the controller determines that the pressure has not been below the threshold longer than the time threshold, the sensor 102 can detect the pressure of the water flow at step 202 again. In some embodiments, steps 202 and 204 can create a feedback loop. The system 100 can perform step 202 and 204 in real time or substantially real time such that the sensor 102 continuously detects the pressure of the water flow and/or the controller 104 continuously compares the pressure to the threshold and/or the time threshold.

If, at step 204, the controller 104 determines the pressure is below the threshold or the controller 104 determines that the pressure has been below the threshold longer than the time threshold, the controller 104 can engage the bypass at step 206. To engage the bypass, the controller 104 can transmit an instruction to the second valve 106. In some embodiments, the controller can transmit an instruction to the first valve 105 and an instruction to the second valve 106. The controller 104 may instruct the first valve 105 to close to prevent water from flowing through the first water inlet 152 (i.e., from the water filtration system 156). The controller 104 may instruct the second valve 106 to open to allow water to flow through the second water inlet 154. When the controller 104 engages the bypass at step 204, water may flow to the outlet 155 from the second water inlet 154 instead of the first water inlet 152.

In some embodiments, at step 206, the controller 104 may automatically schedule a service call. In some embodiments, at step 206, the controller 104 may transmit a signal to a computer system indicative of the controller 104 engaging the bypass. The computer system may be configured to process the signal to determine malfunctions of the water supply system 150. The computer system may automatically schedule a service call based on the signal.

At step 208 the sensor 102 may detect a pressure of a water flow through the first water inlet 152 and/or the second water inlet 154. The sensor 102 may transmit a signal that can be indicative of the pressure of the water flow to the controller 104.

At step 210, the controller 104 may determine if the pressure of the water flow is above the threshold. The controller 104 may compare the pressure of the water flow to the threshold. In some embodiments, the threshold may be between about 30 pounds per square inch (PSI) and about 90 PSI. In some embodiments, the threshold may be between about 40 PSI and about 80 PSI. In some embodiments, the threshold may be between about 50 PSI and 70 PSI.

In some embodiments, the controller 104 may compare the pressure of the water flow to the threshold over a period of time. The controller 104 may compare the pressure of the water flow to the threshold over a period of time to determine if the pressure has been above the threshold for longer than a time threshold. In some embodiments, the time threshold may be between about 5 minutes and about 60 minutes. In some embodiments, the time threshold may be between about 10 minutes and about 50 minutes. In some embodiments, the time threshold may be between about 20 minutes and 40 minutes.

If at step 210, the controller 104 determines the pressure is not above the threshold or the controller determines that the pressure has not been above the threshold longer than the time threshold, the sensor 102 can detect the pressure of the water flow at step 208 again. In some embodiments, steps 208 and 210 can create a feedback loop. The system 100 can perform step 208 and 210 in real time or substantially real time such that the sensor 102 continuously detects the pressure of the water flow and/or the controller 104 continuously compares the pressure to the threshold and/or the time threshold.

If, at step 210, the controller 104 determines the pressure is above the threshold or the controller 104 determines that the pressure has been above the threshold longer than the time threshold, the controller 104 can disengage the bypass at step 212. To disengage the bypass, the controller 104 can transmit an instruction to the second valve 106. In some embodiments, the controller can transmit an instruction to the first valve 105 and an instruction to the second valve 106. The controller 104 may instruct the first valve 105 to open to allow water to flow through the first water inlet 152 (i.e., from the water filtration system 156). The controller 104 may instruct the second valve 106 to close to prevent water from flowing through the second water inlet 154. When the controller 104 disengages the bypass at step 206, water may flow to the outlet 155 from the first water inlet 152.

In some embodiments, at step 206, the controller 104 may transmit a signal to a computer system indicative of the controller 104 disengaging the bypass. The computer system may be configured to process the signal to determine (e.g., detect) malfunctions of the water supply system 150.

In some embodiments, the system 100 can continuously repeat steps 202-10 such that the system 100 is continuously and/or automatically controlling pressure in the water supply system 150.

Computer Systems

Figure 3:
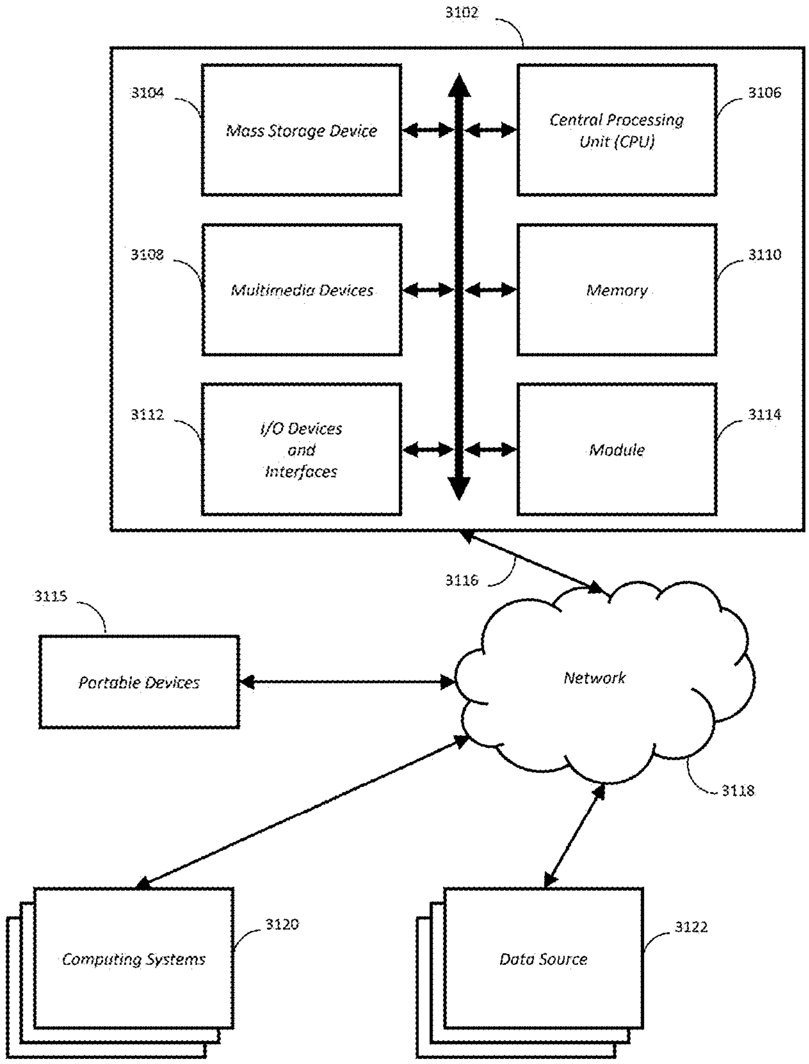
FIG. 3 illustrates a block diagram illustrating an embodiment of a computer hardware system configured to run software for implementing one or more embodiments of the system for automatic pressure control disclosed herein.

FIG. 3 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 3. The example computer system 3102 is in communication with one or more computing systems 3120 and/or one or more data sources 3122 via one or more networks 3118. While FIG. 3 illustrates an embodiment of a computing system 3102, it is recognized that the functionality provided for in the components and modules of computer system 3102 may be combined into fewer components and modules, or further separated into additional components and modules.

The computer system 3102 can comprise a module 3114 that carries out the functions, methods, acts, and/or processes described herein. The module 3114 is executed on the computer system 3102 by a central processing unit 3106 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 3102 includes one or more processing units (CPU) 3106, which may comprise a microprocessor. The computer system 3102 further includes a physical memory 3110, such as random-access memory (RAM) for temporary storage of information, a read only memory (ROM) for permanent storage of information, and a mass storage device 3104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 3102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 3102 includes one or more input/output (I/O) devices and interfaces 3112, such as a keyboard, mouse, touch pad, and printer. The I/O devices and interfaces 3112 can include one or more display devices, such as a monitor, that allows the visual presentation of data to a user. More particularly, a display device provides for the presentation of GUIs as application software data, and multi-media presentations, for example. The I/O devices and interfaces 3112 can also provide a communications interface to various external devices. The computer system 3102 may comprise one or more multi-media devices 3108, such as speakers, video cards, graphics accelerators, and microphones, for example.

The computer system 3102 may run on a variety of computing devices, such as a server, a Windows server, a Structure Query Language server, a Unix Server, a personal computer, a laptop computer, and so forth. In other embodiments, the computer system 3102 may run on a cluster computer system, a mainframe computer system and/or other computing system suitable for controlling and/or communicating with large databases, performing high volume transaction processing, and generating reports from large databases. The computing system 3102 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 3102 illustrated in FIG. 3 is coupled to a network 3118, such as a LAN, WAN, or the Internet via a communication link 3116 (wired, wireless, or a combination thereof). Network 3118 communicates with various computing devices and/or other electronic devices. Network 3118 is communicating with one or more computing systems 3120 and one or more data sources 3122. The module 3114 may access or may be accessed by computing systems 3120 and/or data sources 3122 through a web-enabled user access point. Connections may be a direct physical connection, a virtual connection, and other connection type. The web-enabled user access point may comprise a browser module that uses text, graphics, audio, video, and other media to present data and to allow interaction with data via the network 3118.

Access to the module 3114 of the computer system 3102 by computing systems 3120 and/or by data sources 3122 may be through a web-enabled user access point such as the computing systems' 3120 or data source's 3122 personal computer, cellular phone, smartphone, laptop, tablet computer, e-reader device, audio player, or another device capable of connecting to the network 3118. Such a device may have a browser module that is implemented as a module that uses text, graphics, audio, video, and other media to present data and to allow interaction with data via the network 3118.

The output module may be implemented as a combination of an all-points addressable display such as a cathode ray tube (CRT), a liquid crystal display (LCD), a plasma display, or other types and/or combinations of displays. The output module may be implemented to communicate with input devices 3112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 3102 may comprise a physical or logical connection established between a remote microprocessor and a mainframe host computer for the express purpose of uploading, downloading, or viewing interactive data and databases on-line in real time. The remote microprocessor may be operated by an entity operating the computer system 3102, including the client server systems or the main server system, an/or may be operated by one or more of the data sources 3122 and/or one or more of the computing systems 3120. In some embodiments, terminal emulation software may be used on the microprocessor for participating in the micro-mainframe link.

In some embodiments, computing systems 3120 who are internal to an entity operating the computer system 3102 may access the module 3114 internally as an application or process run by the CPU 3106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 3102 may include one or more internal and/or external data sources (for example, data sources 3122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 3102 may also access one or more databases 3122. The databases 3122 may be stored in a database or data repository. The computer system 3102 may access the one or more databases 3122 through a network 3118 or may directly access the database or data repository through I/O devices and interfaces 3112. The data repository storing the one or more databases 3122 may reside within the computer system 3102.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A system for automatic water pressure control in a water supply system, comprising:

a controller;

a first sensor configured to determine a pressure of water flow through a first water inlet and transmit a signal to the controller indicative of the pressure of water flow through the first water inlet;

a second sensor configured to determine a pressure of water flow through a second water inlet and transmit a signal to the controller indicative of the pressure of water flow through the second water inlet; and a valve in the second water inlet, wherein the first water inlet is an inlet from a water filtration system, and the second water inlet is a water filtration bypass, and wherein, in order to maintain the pressure of water flow in the water supply system above a predetermined threshold, the controller is configured to open and close the valve based on received signals from at least one of the first sensor or the second sensor, wherein the controller is configured to open the valve so water flows through the second water inlet when the pressure of water flow in the first water inlet decreases below the predetermined threshold, and wherein the controller is configured to transmit information to a computer system indicative of at least one of when the pressure of water flow in the water supply system is below the predetermined threshold or when the pressure of water flow in the water supply system is above the predetermined threshold.

2. The system of claim 1, wherein the controller is integrated with at least one of the first sensor or the second sensor.

3. The system of claim 1, wherein the valve can be opened and closed manually.

4. The system of claim 1, wherein the water filtration system is a reverse osmosis filtration system.

5. The system of claim 1, wherein the predetermined threshold is between about 30 PSI and about 90 PSI.

6. The system of claim 1, wherein the controller is configured to close the valve so water flows through the first water inlet when the pressure of water flow in the second water inlet increases above the predetermined threshold.

7. The system of claim 1, wherein the controller is configured to open the valve so water flows through the second water inlet if the pressure of water flow in the first water inlet decreases below the predetermined threshold for a predetermined period of time.

8. The system of claim 7, wherein the controller is configured to close the valve so water flows through the first water inlet when the pressure of water flow in the second water inlet increases above the predetermined threshold for the predetermined period of time.

9. The system of claim 8, wherein the predetermined period of time is between about 5 minutes and about 60 minutes.

10. The system of claim 1, wherein the controller is Internet of Things (IOT) enabled.

11. The system of claim 1, wherein the computer system is configured to automatically schedule a maintenance request based on the information received from the controller.

12. A method of maintaining pressure of water flow in a water supply system, the method comprising:

determining, by a first sensor, a pressure of water flow through a first water inlet, wherein the first water inlet is an inlet from a water filtration system;

transmitting, by the first sensor, a signal to a controller indicative of the pressure of water flow through the first water inlet;

receiving, by the controller, the signal from the first sensor;

comparing, by the controller, the pressure of water flow through the first water inlet to a predetermined threshold;

determining, by the controller, the pressure of water flow through the first water inlet is below the predetermined threshold;

based on the determination that the pressure of water flow through the first water inlet is below the predetermined threshold, opening, by the controller, a valve in a second water inlet to increase the pressure of water flow in the water supply system above the predetermined threshold, wherein the second water inlet is an inlet from a water bypass;

determining, by a second sensor, a pressure of water flow through the second water inlet;

transmitting, by the second sensor, a signal to the controller indicative of the pressure of water flow through the second water inlet;

receiving, by the controller, the signal from the second sensor;

comparing, by the controller, the pressure of water flow through the second water inlet to the predetermined threshold;

determining, by the controller, the pressure of water flow through the second water inlet is above the predetermined threshold;

based on the determination that the pressure of water flow through the second water inlet is above the predetermined threshold, closing, by the controller, the valve in the second water inlet;

transmitting, by the controller, information to a computer system indicative of at least one of the pressure of water flow through the first water inlet decreasing below the predetermined threshold, or the pressure of water flow through the second water inlet increasing above the predetermined threshold.

13. The method of claim 12, wherein the predetermined threshold is between about 30 PSI and about 90 PSI.

14. The method of claim 12, wherein the controller opens the valve if the pressure of the water through the first water inlet is below the predetermined threshold for a predetermined period of time.

15. The method of claim 14, wherein the controller closes the valve if the pressure of the water through the second water inlet is above the predetermined threshold for the predetermined period of time.

16. The method of claim 15, wherein the predetermined period of time is between about 5 minutes and about 60 minutes.

17. The method of claim 12, wherein the water filtration system is a reverse osmosis filtration system.

18. The method of claim 12, wherein the computer system is configured to schedule a maintenance request based on the information received from the controller.

19. The method of claim 12, wherein the computer system is configured to process the information received from the controller to determine malfunctions of the water supply system.

* * * * *